US 7,747,340 B2

(12) United States Patent
Jones

(10) Patent No.: US 7,747,340 B2
(45) Date of Patent: *Jun. 29, 2010

(54) DYNAMIC ORDER SWAPPING IN MASS CUSTOMIZATION PRODUCTION ENVIRONMENT

(75) Inventor: Kevin T. Jones, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 270 days.

This patent is subject to a terminal disclaimer.

(21) Appl. No.: 11/946,972

(22) Filed: Nov. 29, 2007

(65) Prior Publication Data

US 2009/0143887 A1 Jun. 4, 2009

Related U.S. Application Data

(63) Continuation of application No. 11/395,054, filed on Mar. 31, 2006, now Pat. No. 7,308,330.

(51) Int. Cl.
G06F 19/00 (2006.01)
G06F 7/00 (2006.01)
G06G 1/14 (2006.01)
G06Q 20/00 (2006.01)
G06Q 30/00 (2006.01)
G06Q 10/00 (2006.01)

(52) U.S. Cl. ........................ 700/100; 700/105; 700/106; 700/216; 705/22; 705/26; 705/28

(58) Field of Classification Search .................... 700/95, 700/97, 99–102, 105, 106, 216, 219; 705/7, 705/10, 22, 26, 28
See application file for complete search history.

(56) References Cited

U.S. PATENT DOCUMENTS

| 5,983,195 | A | * | 11/1999 | Fierro | 705/10 |
| 5,991,543 | A | | 11/1999 | Amberg et al. | 395/712 |
| 5,995,757 | A | | 11/1999 | Amberg et al. | 395/712 |
| 6,182,275 | B1 | | 1/2001 | Belitz et al. | 717/1 |
| 6,236,901 | B1 | | 5/2001 | Goss | 700/95 |
| 6,327,706 | B1 | | 12/2001 | Amberg et al. | 717/11 |
| 6,427,091 | B1 | | 7/2002 | Davis et al. | 700/115 |
| 6,529,797 | B2 | | 3/2003 | Williams et al. | 700/216 |
| 6,535,915 | B1 | | 3/2003 | Valys et al. | 709/222 |
| 6,543,047 | B1 | | 4/2003 | Vrhel, Jr. et al. | 717/121 |
| 6,550,062 | B2 | | 4/2003 | Barajas et al. | 717/178 |
| 6,611,727 | B2 | | 8/2003 | Bickley et al. | 700/99 |
| 6,615,092 | B2 | | 9/2003 | Bickley et al. | 700/99 |
| 6,711,798 | B2 | | 3/2004 | Sanders et al. | 29/407.01 |
| 6,714,937 | B1 | | 3/2004 | Eynon et al. | 707/102 |
| 6,721,946 | B1 | | 4/2004 | Fogarty et al. | 717/175 |
| 6,760,708 | B1 | | 7/2004 | Hubbard et al. | 705/27 |
| 6,832,435 | B2 | | 12/2004 | Sanders et al. | 29/786 |
| 6,892,104 | B2 | | 5/2005 | Patil et al. | 700/230 |

(Continued)

Primary Examiner—Crystal J Barnes-Bullock
(74) Attorney, Agent, or Firm—Hamilton & Terrile, LLP; Stephen A. Terrile

(57) ABSTRACT

A method for addressing process variability in a build-to-order, mass customization production environment. The method includes receiving an order for a product having a particular configuration defined by the order, initiating a production order specifically assigned to the order, fabricating the product based upon the production order, determining if an unrelated product order contains an identical product item configuration and automatically swapping identical product items contained on unrelated production orders to optimize overall production process objectives.

21 Claims, 7 Drawing Sheets

U.S. PATENT DOCUMENTS

| | | | |
|---|---|---|---|
| 6,912,552 B2 | 6/2005 | Hubbard et al. | 707/204 |
| 6,948,169 B1 | 9/2005 | Amro et al. | 717/178 |
| 6,950,714 B2 | 9/2005 | Bickley et al. | 700/100 |
| 7,209,887 B2 * | 4/2007 | Yen et al. | 705/7 |
| 7,308,330 B2 * | 12/2007 | Jones | 700/100 |
| 7,343,212 B1 * | 3/2008 | Brearley et al. | 700/106 |
| 2005/0055119 A1 * | 3/2005 | Yen et al. | 700/100 |
| 2005/0177440 A1 * | 8/2005 | Mathe et al. | 705/26 |
| 2005/0246335 A1 * | 11/2005 | Baeza et al. | 707/5 |
| 2007/0130031 A1 * | 6/2007 | Esau et al. | 705/28 |

* cited by examiner

DYNAMIC ORDER SWAPPING IN MASS CUSTOMIZATION PRODUCTION ENVIRONMENT

This application is a continuation of application Ser. No. 11/395,054, filed Mar. 31, 2006 now U.S. Pat. No. 7,308,330, entitled "Dynamic Order Swapping in BTO Environment" and naming Kevin T. Jones as inventor, which is hereby incorporated by reference in its entirety.

BACKGROUND OF THE INVENTION

1. Field of the Invention

The present invention relates to the field of in a mass customization build-to-order environment and more particularly to a build-to-order environment for manufacturing information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to manufacture information handling systems in a mass customization build-to-order environment, such as at that practiced by Dell Inc. In known build to order environments, a production order (or work order) is initiated in manufacturing for the specific fulfillment of a customer order. The association of the production order, and the specific products contained on the production order, remains fixed to the customer order. When all products contained on the production order are completed, the order is available to ship to the customer.

Challenges occur due to natural process variability that can cause one or mote product items on a production order to be inordinately delayed in completion. In the case of an order containing multiple product items, this delay can lead to significant order accumulation within the manufacturing facility, awaiting the final product items to be completed. For all order types, a delayed product completion can lead to customer dissatisfaction if the delay extends beyond the committed order completion date. In other cases, production orders tied to specific customer orders in a build to order, mass customization environment can be considered sub-optimally sequenced within the work in progress of the production facility, even if such production orders are not yet considered delayed. In many cases, there may be other production orders that contain identical product items for which there are not equivalent concerns regarding order accumulation or customer dissatisfaction or for which other optimizing criteria are of a lower measurement.

A number of methodologies have been developed that relate to this issue. One known process is to initiate production orders that are not yet specifically associated to customer orders. The initiation of such orders can be based upon actual backlog of customer orders (built to order) or based on forecasted demand. Once production is completed, units of production can be associated to existing customer orders or placed in an inventory stock to then be associated with customer orders upon their receipt. For example, FIG. 1, labeled Prior Art, shows a block diagram of a build to order scenario with limited configurations. This methodology can allow for multiple unique product configurations to be processed, but becomes increasingly inefficient as the number of unique product configurations multiplies as customers are given the choice to select an increasing number of product options (mass customization).

As the number of potential configuration permutations increases in a mass customization environment, known manufacturing methodologies initiate production orders explicitly associated to unique customer orders. Using the explicitly associated build to order methodology, a number of solutions have been developed to mitigate work in progress sub-optimizing issues such as excessive order accumulation and specific late orders causing customer dissatisfaction. Within the factory processes, sub-optimized orders are identified and attempts to accelerate or expedite these identified products through the process cycle are developed. The attempts to accelerate or expedite the fabrication of these products can occur by giving these identified products a higher sequencing or scheduling priority on resources used to perform subsequent processing tasks. For example, FIG. 2 shows a block diagram of a built to order scenario in a mass customization environment where sub-optimized production order components are expedited within the production process. Alternate exception management processes may be implemented. For example, if a customer order is canceled whilst the associated production order is in progress, exception processes may be used to search for an un-started customer order with a matching product configuration, and re-associated the in-progress production order to the previously un-started customer order. Also for example, the exception processes may be used where product items tied to particularly troublesome customer orders can be expedited by identifying the problem product items and either restarting a new, replacement product item or swapping out an in-progress product item; all of which is manually managed using human intervention. And lastly, another method to mitigate the need for order accumulation is to allow partial shipping of customer orders.

SUMMARY OF THE INVENTION

In accordance with the present invention, a method for addressing process variability in a build-to-order, mass customization production environment is set forth. The method acknowledges the inherent efficiencies of initiating production orders uniquely assigned to specific customer orders. The method also recognizes that product items on unrelated production orders may contain identical product item con figurations. The method routinely and automatically swaps identical product items contained on unrelated production orders to optimize overall process throughput as measured against optimizing criteria, such as the minimization of order accumulation, order lateness, margin maximization, customer importance, and revenue attainment, caused by natural process variability. The method preserves the efficiency advantage of initiating production orders specifically assigned to customer orders, but by routinely and automatically facilitating one-for-one, in-process cross order swaps of identical product items, the method allows for an increased level of flexibility to optimize the overall production process. Additionally, production process parameters can be maintained and applied to the method such that production, process optimization objectives can be modified on an ongoing basis, reflecting changing business conditions and automatically executed within the production process.

In one embodiment, the invention relates to a method for addressing process variability in a build-to-order, mass customization production environment. The method includes receiving an order for a product having a particular configuration defined by the order, initiating a production order specifically assigned to the order, fabricating the product based upon the production order, determining if an unrelated product order contains an identical product item configuration and automatically swapping identical product items contained on unrelated production orders to optimize overall production process objectives.

In another embodiment, the invention relates to an apparatus for addressing process variability in a build-to-order, mass customization production environment. The apparatus includes means for receiving an order for a product having a particular configuration defined by the order, means for initiating a production order specifically assigned to the order, means for fabricating the product based upon the production order, means for determining if an unrelated product order contains an identical product item configuration, and means for automatically swapping identical product items contained on unrelated production, orders to optimize overall production process objectives.

In another embodiment, the invention relates to a build-to-order, mass customization production facility. The facility includes a manufacturing control system and a manufacturing facility coupled to the manufacturing control system. The manufacturing control system receives an order for a product having a particular configuration defined by the order, initiates a production order specifically assigned to the order, determines if an unrelated product order contains an identical product item configuration, and automatically swaps identical product items contained on unrelated production orders to optimize overall production process objectives. The manufacturing facility fabricates the product based upon the production order.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
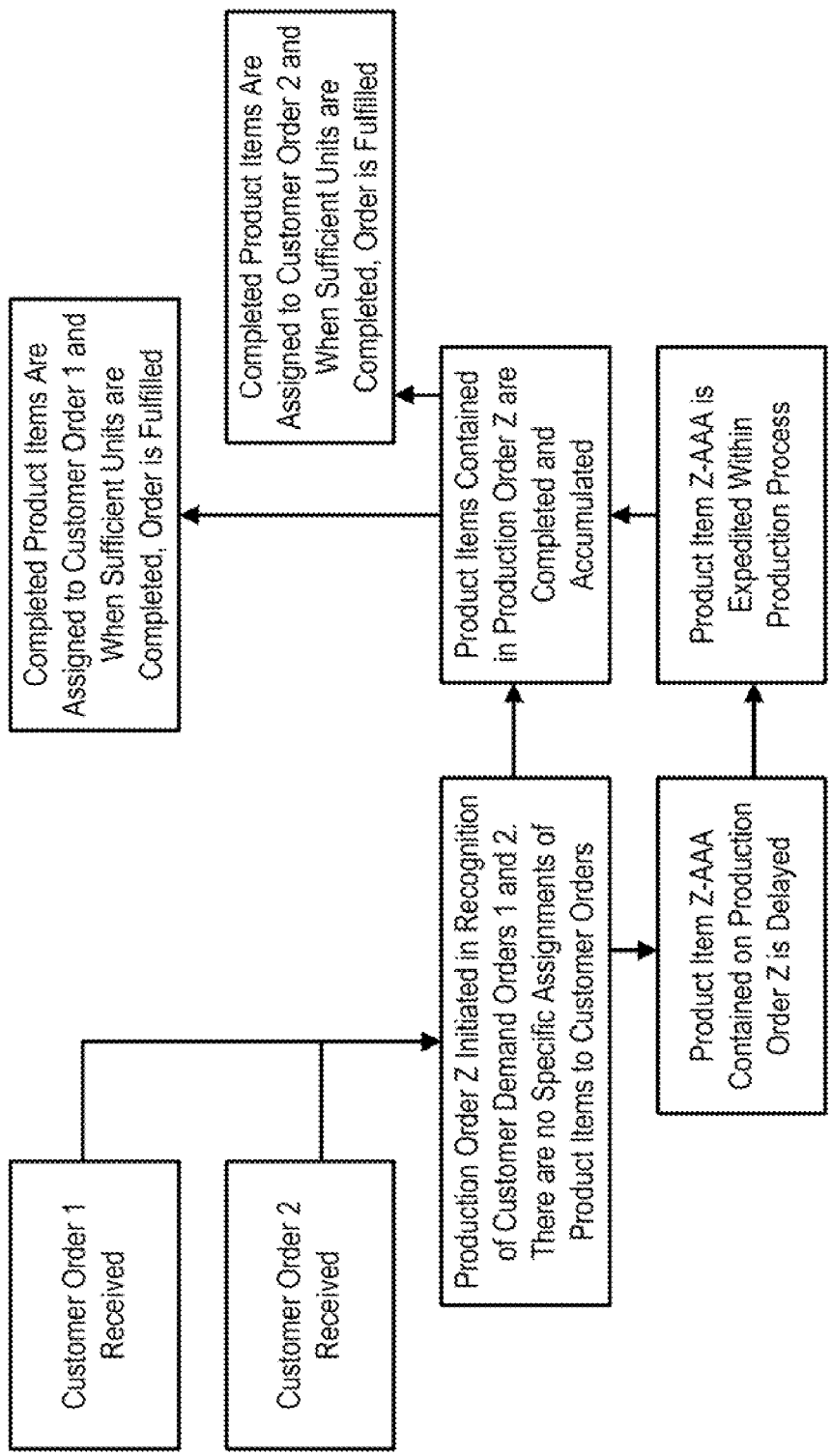
FIG. 1, labeled Prior Art, shows a block diagram of a built to order scenario with limited configurations.
Figure 2:
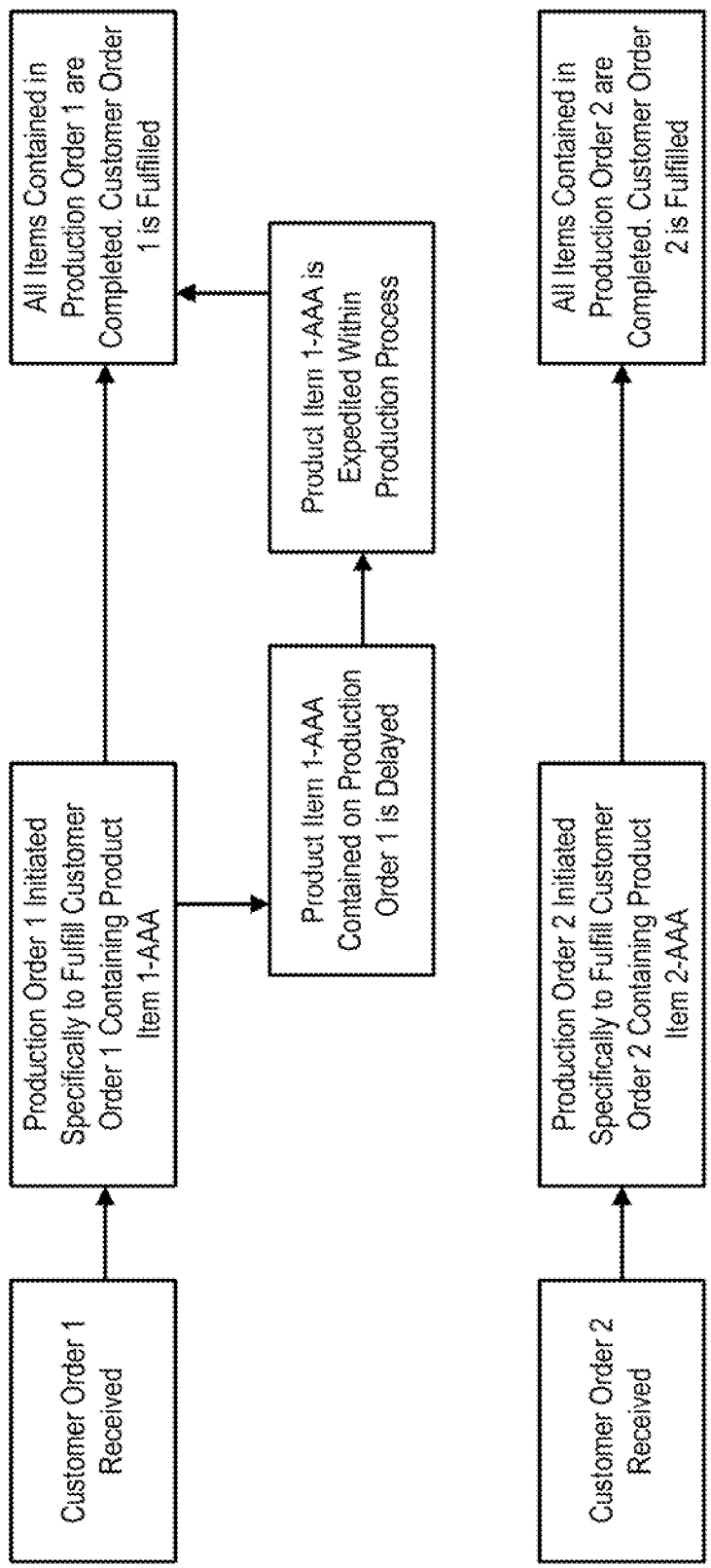
FIG. 2, labeled Prior Art, shows a block diagram of a build to order scenario with mass customization.
Figure 3:
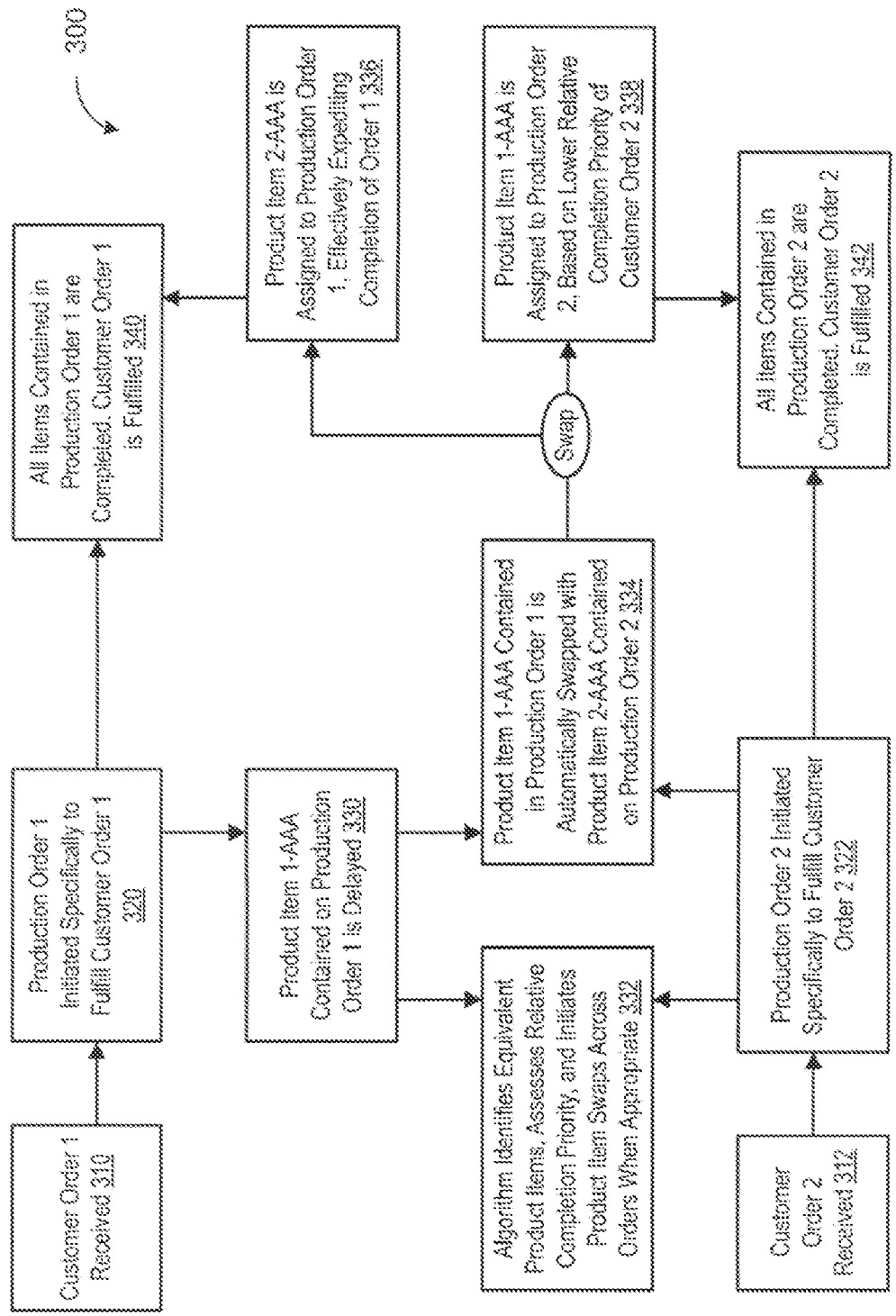
FIG. 3 shows a block diagram of a build to order scenario with mass customization and product item swapping.

Referring to FIG. 3, a block diagram of a build to order scenario with mass customization and product item swapping 300 is shown. More specifically, the scenario begins with a customer order (customer order 1) being received at step 310 and another, unrelated customer order (customer order 2) being received at step 312. A production order is initiated (production order 1) specifically to fulfill customer order 1 at step 320. Another production order is initiated (production order 2) specifically to fulfill customer 2 order at step 322.

While production order 1 is within work in progress, it is determined at step 330 that a product item (product item 1-AAA), which is contained within production order 1, is an equivalent product item to one or more product items contained on other production orders tied to other specific customer orders. An item swapping function within a manufacturing system identifies these equivalent product items, assesses relative completion priority and initiates a product item swap across orders when appropriate at step 332. If the item swapping function determines that an item swap is appropriate, then the item swapping function automatically performs the product item swaps by breaking the original product item to production order associations, then regenerating swapped product item to production order associations at step 334.

In the example of FIG. 3, it is shown that Product Item 1-AAA contained on Production Order 1 has been delayed during work in progress, and an equivalent, swappable product item 2 is available with an earlier planned completion time but being specifically assigned to Customer Order 2 that has a lower measurement of optimized completion priority. This triggers the automatic order swapping process at step 334. Thus, Production Order 1 is effectively expedited within the production process at step 336, yet agnostic to any expediting status of Product Item 1-AAA, originally contained on Production Order 1. Product Item 1-AAA is assigned to Production Order 2 based on a lower relative completion priority of customer order 2 at step 338. When all items contained within production order 1 are completed, customer order 1 is fulfilled at step 340. When all items contained within production order 2 are completed, the customer order 2 is fulfilled at step 342.

Figure 4:
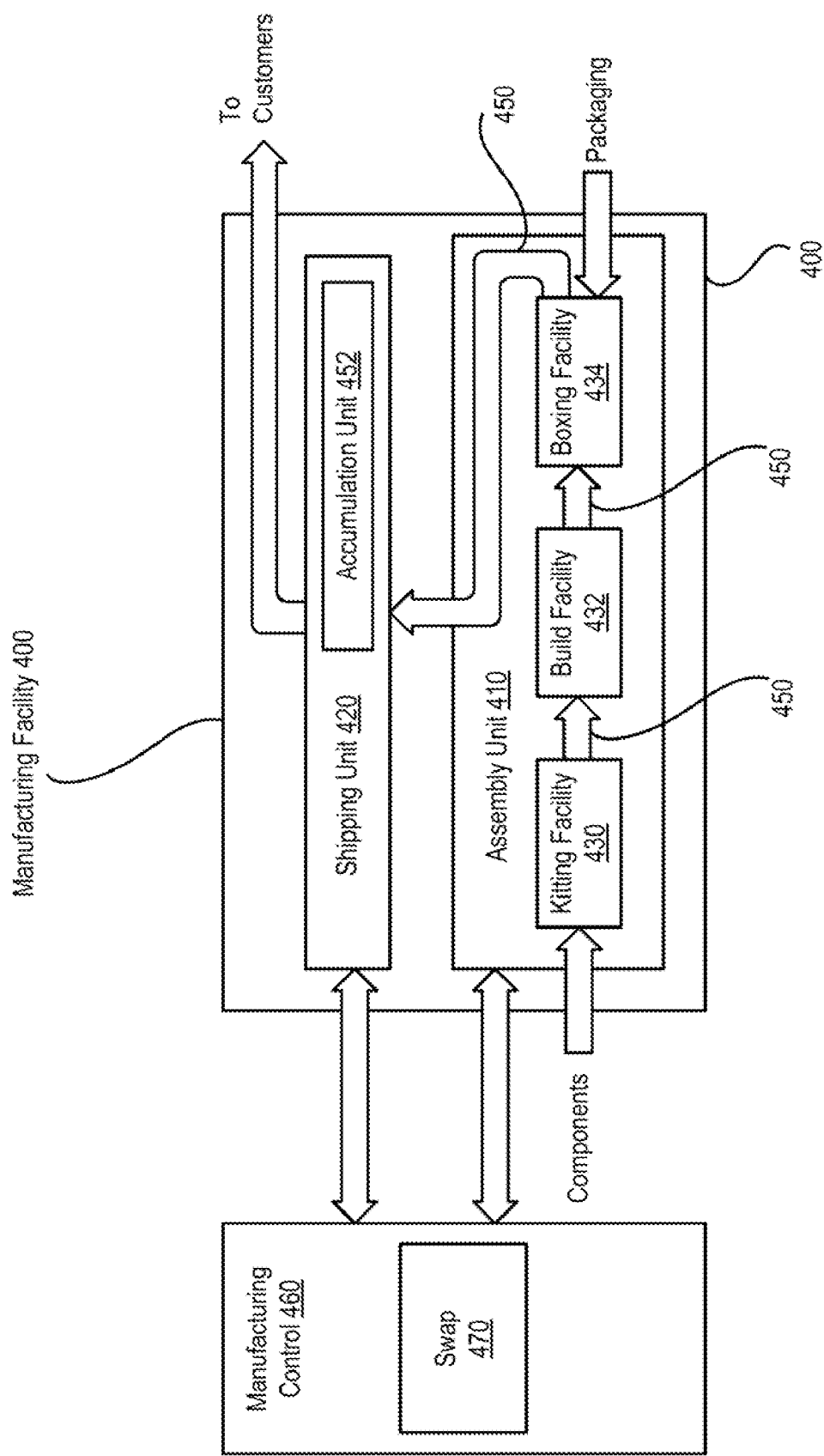
FIG. 4 shows a block diagram of a build to order manufacturing facility having mass customization and product item swapping.
Figure 5:
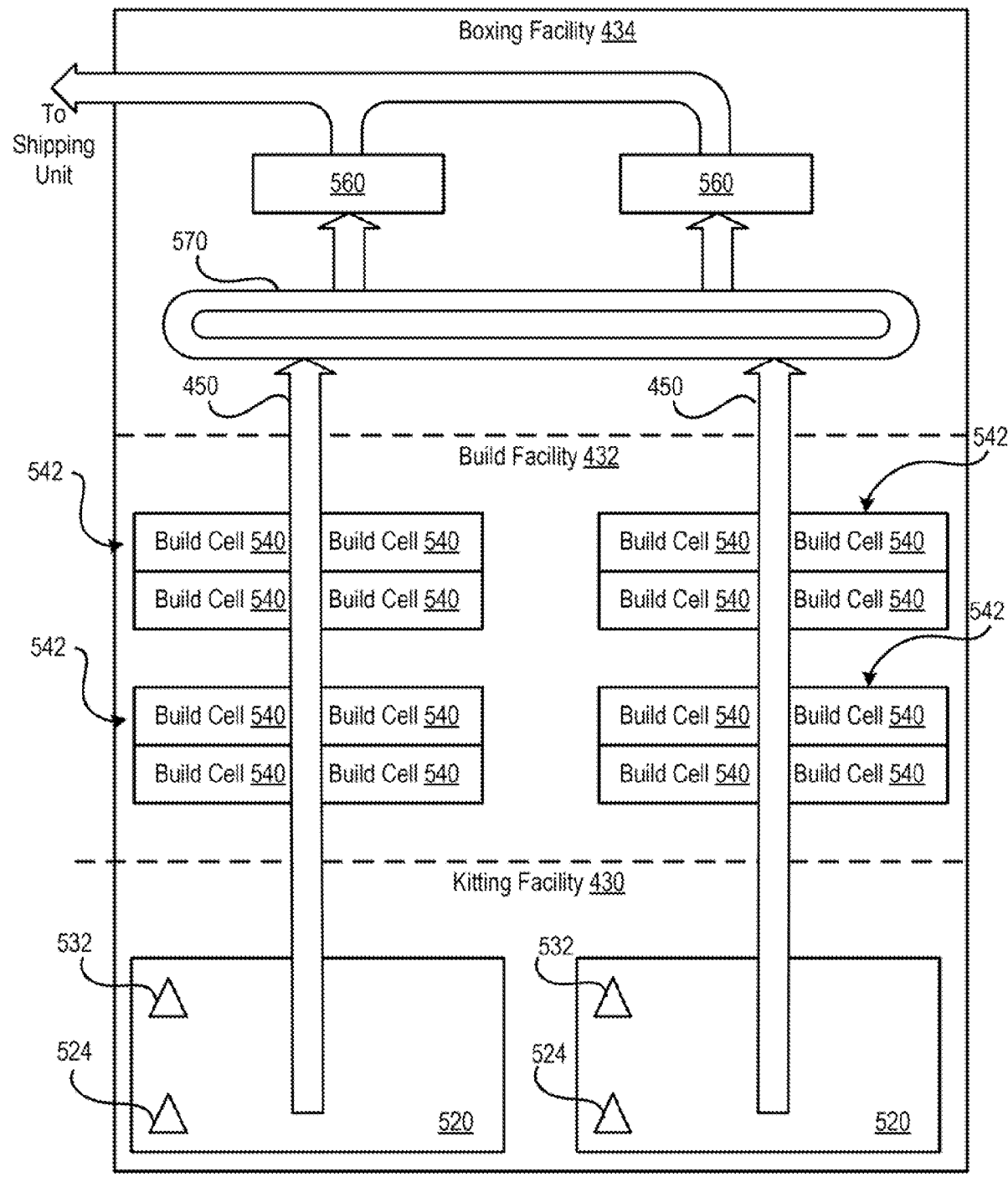
FIG. 5 shows a more detailed block diagram of a build to order manufacturing facility having mass customization and product item swapping.
Figure 6:
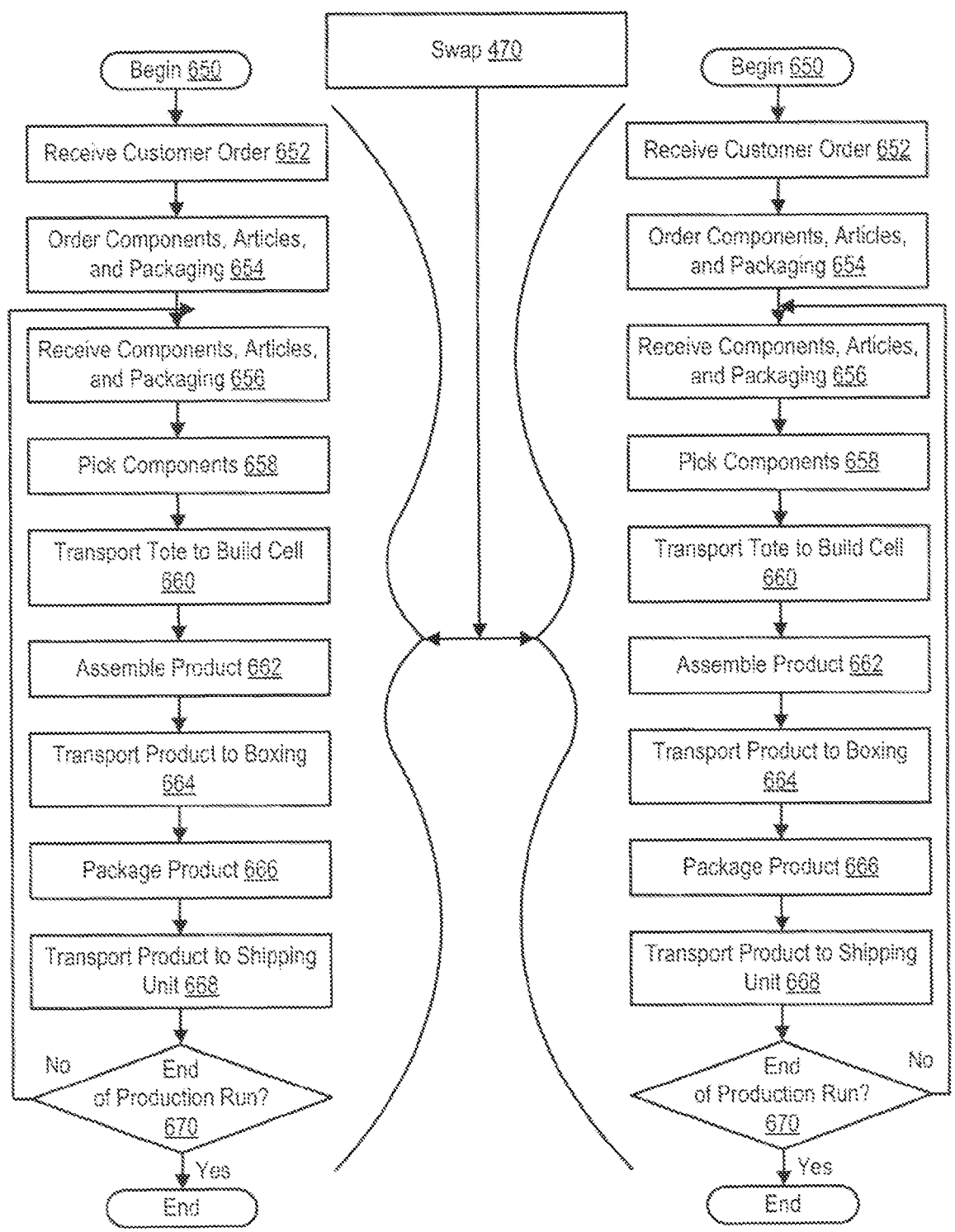
FIG. 6 shows a flow chart of the operation of product item swapping in a build to order environment.

FIG. 4 shows a block-diagram of a build to order manufacturing facility 400 having mass customization and product item swapping. FIG. 5 shows a block diagram of an assembly unit 500 of build to order manufacturing facility 400 having mass customization and product item swapping 400. FIG. 6 shows a flow chart of the operation of product item swapping in a build to order environment.

Referring now to FIGS. 4-6, the manufacturing facility 400 manufactures products such as information handling systems, which are shipped directly to customers, along with associated articles (such as monitors, etc). The manufacturing facility 400 includes an assembly unit 410 and a shipping unit 420.

Assembly unit 410 includes three distinct sections: a kitting facility 430, a build facility 432, and a boxing facility 434. Further, the three sections are disposed with kitting facility 430 and boxing facility 434 situated adjacent to exterior walls, and build facility 432 situated between kitting facility 430 and boxing facility 434. Material is transported across the manufacturing facility via a transportation system 450. The shipping unit 420 includes an accumulation unit 452 in which individual product items which make up an order are stored while the remainder of an order completes fabrication.

The manufacturing facility is controlled via a manufacturing control system 460 which is coupled to the assembly unit 410 and the shipping unit 420. The manufacturing control system 460 includes a swap module 470 for controlling product item swapping within the manufacturing facility 400.

The fabrication process begins at block 650, with assembly facility 410 beginning a production cycle. First, the manufacturer receives one or more customer orders (block 652). Then, the manufacturer orders from suppliers any components needed to manufacture the products for the customer orders and any articles, as well as any packaging (such as boxes and protective inserts) needed to fill the customer orders (block 654). Preferably, to minimize the inventory carried in manufacturing plant 400, few if any components, articles, and packaging will be left over from previous production runs. Therefore, at the beginning of each production run, most or all of the components, articles, and packaging for the orders in that run are ordered. from suppliers. Production runs may nevertheless overlap to some degree, as the manufacturer need not wait until the last item for one run is shipped before placing orders with suppliers for components for the next production run.

As shown at block 656, manufacturing facility 400 begins receiving the ordered components, articles, and packaging. Specifically, manufacturing facility 400 resides in a building where the assembly unit 410 is located in one region and the shipping unit 420 is located in another region. Product components are received in assembly unit 410, via docks closer to the kitting facility 430. By contrast, packaging components for assembled product items enter assembly unit 410 closer to the boxing facility 434.

With reference to FIG. 5, the kitting facility 430 includes a plurality of kitting lines 520. Once sufficient components have been received, particular orders are selected for fulfillment, and the process of building particular items such as information handling systems in those orders is initiated.

The process begins with a bill of material or traveler being printed for a particular computer in a selected order. The traveler is a document that uniquely identifies the specific product such as an information handling system throughout the assembly process. This unique identification also links the information handling system with the order for which the information handling system is being built. The traveler preferably includes a barcode with the identifying information, as well as a list of the specific components that are to be picked and assembled. The traveler is printed at the end of kitting line and is placed in a container and scanned with a first traveler scanner 524. The container may also be referred to as a tote.

After the traveler is scanned, a conveyor in the kitting line may carry the tote. The conveyor 450 may be part of a material-control system that includes or otherwise communicates with other manufacturing systems or subsystems, such as a kitting-management system. Movement of the tote containing the traveler may be initiated by pressing a particular button in communication with the kitting-management system, for example. The traveler scanner 524, as well as other input and output devices, may also communicate with the kitting-management system.

As the conveyor carries the tote, one or more operators (preferably more) pick the required components and place those components into the tote (block 658). The process of collecting the components to be used in assembling a particular product may also be referred to as kitting, and the collected components may be referred to as kits.

After all of the required components have been picked, a second traveler scanner 532 may be used to scan the traveler. The kitting-management system and the material-control system may utilize the data from that scan to track movement of and update status indicators for the components individually and the tote as a whole. The tote may then be transported to build facility 432 (block 660).

The components are assembled in build facility 432 (block 662). The build facility 432 includes a number of build cells 540 within which assembly of the product from the components occurs. The build cells 540 are preferably arranged in one or more groups of four. A group of four build cells may be referred to as a quadruplet of build cells 542, or simply a cell quad. Build facility 432 includes four cell quads 542, along with two transportation systems 450, with two cell quads 542 situated in series along (and preferably below) each of transportation systems 450. In addition, two kitting lines 520 and two boxing lines 560 are shown. Each transportation system 450 links one kitting line 520 with two cell quads 542. Preferably, both of transportation systems 450 discharge the products onto a recirculating conveyor (or loop) 570, and each product is then automatically pulled from recirculating conveyor 570 onto any of boxing lines 560 that is not already busy.

After the product is assembled, the product is then transported to a boxing line 560 (block 664) within boxing facility 434 to be packaged (block 666). After the product is boxed, the product is transmitted to the shipping unit 420 (block 668). The manufacturing system then determines whether a production run has completed (block 670). If not, then the process receives more component, articles and packaging (block 654).

At any time during the assembly of the product, the swap module 470 within the manufacturing control system 460 can swap a product contained in one order with a product item contained in another order.

Figure 7:
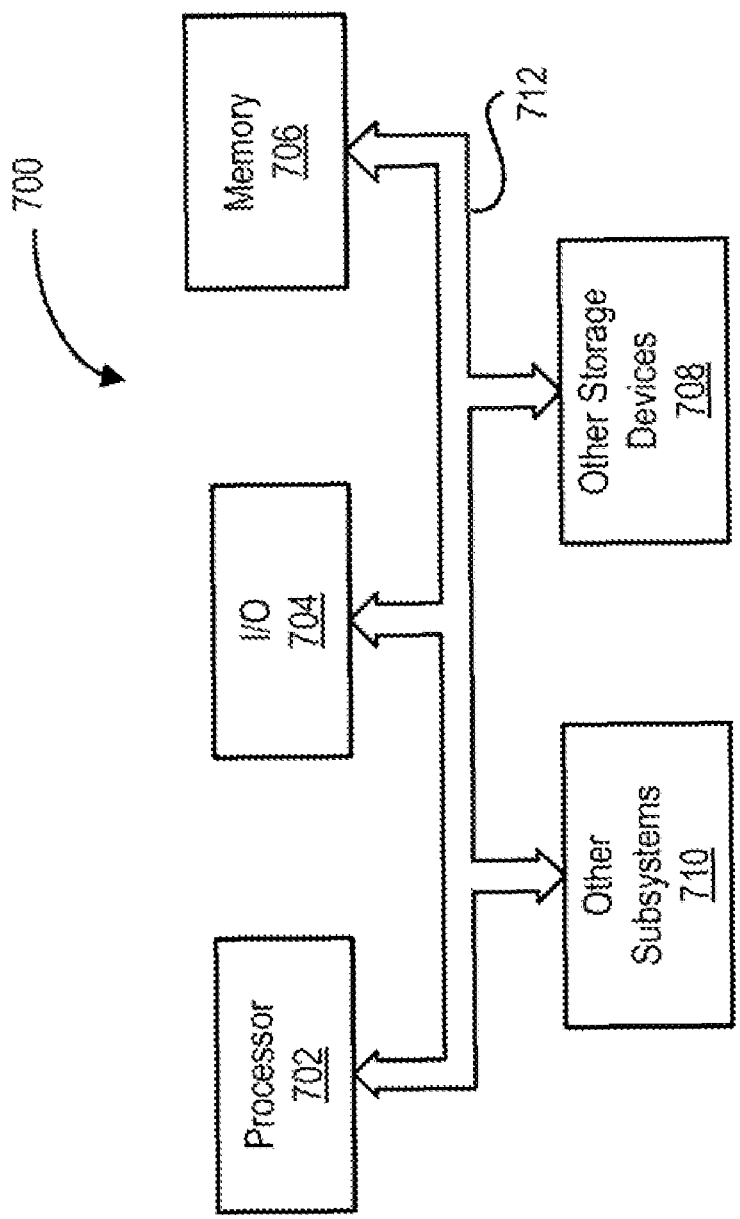
FIG. 7 shows a block diagram of an information handling system.

One example of the items that are swapped is an information handling system. Referring briefly to FIG. 7, a system block diagram of an information handling system 700 is shown. The information handling system 700 includes a processor 702, input/output (I/O) devices 704, such as a display, a keyboard as well as a mouse and associated controllers, memory 706 including non-volatile memory such as a hard disk drive and volatile memory such as random access memory, and other storage devices 708, such as a removable media and associated drives, and various other subsystems 710, all interconnected via one or more buses 712.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, many configurations within the manufacturing facility are contemplated. Different numbers and combinations of transportation systems, kitting lines, build cells, and boxing lines could be utilized. For example, four transportation systems could be provided, two kitting lines could merge onto one or more of the transportation systems, six cell quads could be disposed along each transportation system, and the boxing facility could include six boxing lines.

Also, for example, many optimizing criteria are contemplated in addition to minimizing order accumulation or order lateness. Different process objectives such as optimizing corporate margin or revenue for a given financial time period or prioritizing specific production orders associated with specific customers are contemplated. Additionally, the relative priority value assigned to each parameter type, and thus the interleaved, overall optimization process is embodied in the invention. Additionally, specific assignment of parameterized priority values are not required, but only illustrate an example of how such an optimizing process could be solved and also allow for ongoing maintenance of the relative importance of process objectives via the maintenance of the entered value of each parameter. Additionally, product items may be associated directly to customer orders and the swapping function may break and then reassociate product items directly to different customer orders.

Also, for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in ail respects.

What is claimed is:

1. A method for addressing process variability in a production environment comprising:
    receiving an order for a product, the product having a particular configuration defined by the order;
    initiating a production order specifically assigned to the order;
    determining if an unrelated product order contains an identical product item configuration;
    automatically swapping identical product items contained on unrelated production orders to optimize overall production process objectives.

2. The method for addressing process variability in the production environment of claim 1 wherein:
    the overall production process objectives include at least one of minimizing order accumulation and reducing order lateness caused by natural process variability.

3. The method for addressing process variability in the production environment of claim 1 wherein:
    the automatically swapping routinely facilitates one-for-one, in-process cross order swaps of identical product items.

4. The method for addressing process variability in the production environment of claim 1 further comprising:
    maintaining production process parameters to minimize order accumulation or order lateness.

5. The method for addressing process variability in the production environment of claim 1 wherein:
    the swapping can occur at any time during the fabrication of the product.

6. The method for addressing process variability in the production environment of claim 1 further comprising:
    assessing completion priority of the order and the unrelated product order; and wherein,
    the automatic swapping occurs based upon the completion priority.

7. The method for addressing process variability in the production environment of claim 1 wherein:
    the swapping includes reassigning the unrelated production order to the order and reassigning the production order to an order corresponding to the unrelated production order.

8. An apparatus for addressing process variability in a production environment comprising:
    means for receiving an order for a product, the product having a particular configuration defined by the order;
    means for initiating a production order specifically assigned to the order;
    means for fabricating the product based upon the production order;
    means for determining if an unrelated product order contains an identical product item configuration to the particular configuration defined by the order;
    means for automatically swapping identical product items contained on unrelated production orders to optimize overall production process objectives.

9. The apparatus for addressing process variability in the production environment of claim 8 wherein:
    the overall production process objectives include at least one of minimizing order accumulation and reducing order lateness caused by natural process variability.

10. The apparatus for addressing process variability in the production environment of claim 8 wherein:

the automatically swapping routinely facilitates one-for-one, in-process cross order swaps of identical product items.

11. The apparatus for addressing process variability in the production environment of claim 8 further comprising:

means for maintaining production process parameters to minimize order accumulation or order lateness.

12. The apparatus for addressing process variability in the production environment of claim 8 wherein:

the swapping can occur at any time during the fabrication of the product.

13. The apparatus for addressing process variability in the production environment of claim 8 further comprising:

means for assessing completion priority of the order and the unrelated product order; and wherein, the automatic swapping occurs based upon the completion priority.

14. The apparatus for addressing process variability in the production environment of claim 8 wherein:

the swapping includes reassigning the unrelated production order to the order and reassigning the production order to an order corresponding to the unrelated production order.

15. A production facility comprising:

a manufacturing control system, the manufacturing control system receiving a order for a product, the product having a particular configuration defined by the order;

initiating a production order specifically assigned to the order;

determining if an unrelated product order contains an identical product item configuration; and, automatically swapping identical product items contained on unrelated production orders to optimize overall production process objectives; and, a manufacturing facility coupled to the manufacturing control system, the manufacturing facility fabricating the product based upon the production order.

16. The production facility of claim 15 wherein:

the overall production process objectives include at least one of minimizing order accumulation and reducing order lateness caused by natural process variability.

17. The production facility of claim 15 wherein:

the automatically swapping routinely facilitates one-for-one, in-process cross order swaps of identical product items.

18. The production facility of claim 15 wherein:

the manufacturing control system maintains production process parameters to minimize order accumulation or order lateness.

19. The production facility of claim 15 wherein:

the swapping can occur at any time during the fabrication of the product.

20. The production facility of claim 15 wherein:

the manufacturing control system assesses completion priority of the order and the unrelated product order; and the automatic swapping occurs based upon the completion priority.

21. The production facility of claim 15 wherein:

the swapping includes reassigning the unrelated production order to the order and reassigning the production order to an order corresponding to the unrelated production order.

* * * * *